UNITED STATES PATENT OFFICE.

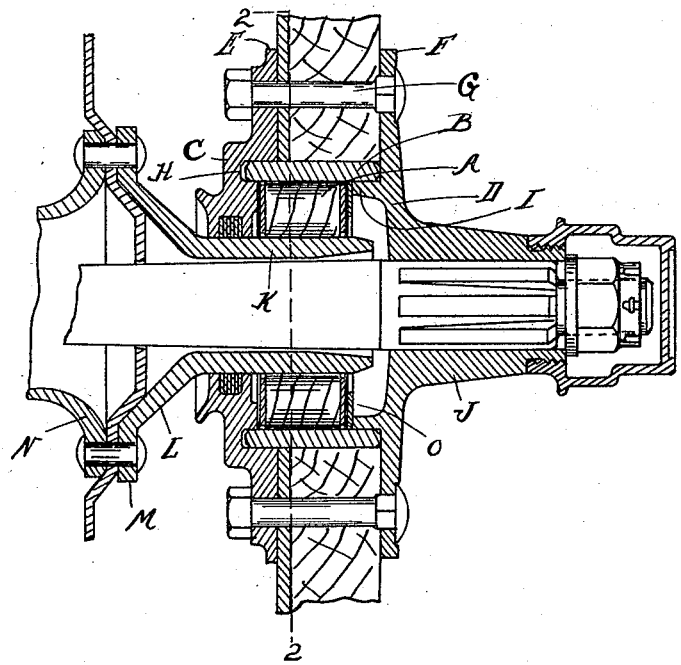
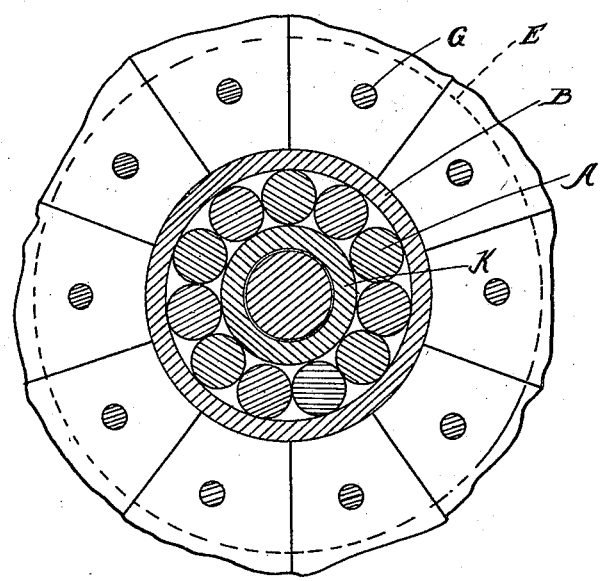

ALANSON P. BRUSH AND OWEN M. NACKER, OF DETROIT, MICHIGAN.

VEHICLE-WHEEL.

1,401,582.    Specification of Letters Patent.    Patented Dec. 27, 1921.

Application filed March 8, 1919. Serial No. 281,516.

*To all whom it may concern:*

Be it known that we, ALANSON P. BRUSH and OWEN M. NACKER, both citizens of the United States of America, residing at Detroit, in the county of Wayne and State of Michigan, have invented certain new and useful Improvements in Vehicle-Wheels, of which the following is a specification, reference being had therein to the accompanying drawings.

The invention relates to vehicle wheels designed for use on motor vehicles, and it is the object of the invention to simplify the construction.

In the present state of the art it is usual to provide motor vehicle wheels with roller bearings and these are generally formed as distinct units located between the wheel hub and axle. Each unit comprises in addition to the rolls, inner and outer annular race members and it has been the practice to press one of these race members into the hub and the other upon the axle, the rolls being retained with one and being engageable with the other. With the present invention we have simplified the construction by forming of the outer race member a structural element of the wheel hub, while the inner race member is a structural portion of the axle. Our improved construction is also one in which the rollers of the bearing will be retained in the hub so as to be readily engageable with the axle member whenever the wheel is mounted thereon.

In the drawings:

Figure 1 is a longitudinal section through the wheel and a portion of the axle of our improved construction;

Fig. 2 is a cross-section on line 2—2 of Fig. 1.

A are the rolls of a roller bearing, B is the outer annular race member which is formed of greater length than the rolls so as to extend beyond the same at each end. C and D are inner and outer hub sections which are provided with bearings to receive the opposite ends of the member B, which member constitutes both a spacer between the hub sections and a pilot for properly alining the same. The sections C and D are provided with outwardly extending flanges E and F for embracing the spokes and are clamped thereto by the bolts G. As specifically shown, the inner section C has an annular groove H therein which receives the inner end of the member B, while the member D has a flange I for engaging the inner face of the member B. The section D has a tapered portion J for engaging the axle, and where the wheel is used as a driver, as is shown, the hub is suitably slotted for engagement with the driving gears.

The inner race member K is formed as a portion of an axle section, being provided with a flaring inner end L terminating in the flange M, which is riveted or otherwise secured to a flange N on the main axle housing.

With the construction as described, the wheel may be assembled by engagement of the spoke spider with the member B and then clamping the members C and D upon opposite sides thereof. Before the clamping of these members C and D the rolls A in any suitable cage or retainer O are placed within the member B and after the securing of the bolts G will be held from disengagement.

What we claim as our invention is:

1. In a vehicle wheel, the combination with the spoked section, of a hub formed of outer and inner members on opposite sides of said spoked section, an annular member constituting the outer race member for a roller bearing fitting the bore of said spoked section and engaging annular bearings in said outer and inner hub sections, said annular member constituting a pilot and spacer between said hub sections, and bolts for clamping said hub sections to the spoked section.

2. In a vehicle wheel, the combination with the spoked section, of an annular member fitting the bore of said spoked section and projecting beyond the same, an inner hub member grooved to receive the inner end of said annular member, an outer hub member having a flange fitting within said annular member, and bolts for clamping said outer and inner members upon the spoked section.

3. In a vehicle wheel, the combination with the spoked section, of an annular member fitting the bore of said spoked section and constituting the outer annular race member of a roller bearing, hub sections arranged on the inner and outer sides of said spoked section having bearings for engaging said annular member, and bolts for clamping said sections to the opposite sides of said spoked member.

4. The combination with a wheel body, of hub sections secured upon opposite sides of said body and in spaced relation, a spacer separate from and removably secured between said sections, an axle having a portion inserted within the spacer, and a series of antifriction bearings holding the spacer and proximate portion of the axle in desired relation, said spacer constituting an outer annular race member for the antifriction bearings.

In testimony whereof we affix our signatures.

ALANSON P. BRUSH.
OWEN M. NACKER.